United States Patent [19]

Timmons

[11] 4,392,283
[45] Jul. 12, 1983

[54] GROMMET CLIP

[75] Inventor: David R. Timmons, Newport Beach, Calif.

[73] Assignee: Automation Industries, Inc., Greenwich, Conn.

[21] Appl. No.: 202,641

[22] Filed: Oct. 31, 1980

[51] Int. Cl.³ .............................................. A44B 21/00
[52] U.S. Cl. .................................. 24/255 SL; 24/257; 248/317
[58] Field of Search ............... 24/255 R, 255 SL, 257, 24/256, 305, 355; 248/317, 74 PB

[56] References Cited

U.S. PATENT DOCUMENTS

| 2,818,871 | 1/1958 | Beaudry | 24/255 SL |
| 2,974,916 | 3/1961 | Richey | 24/302 |
| 3,050,578 | 8/1962 | Huebner | 248/74 PB |
| 3,161,929 | 12/1964 | Swett | 248/317 |
| 3,348,275 | 10/1967 | Lawrence | 24/137 R |

FOREIGN PATENT DOCUMENTS 873304   7/1961   United Kingdom ................. 24/302

Primary Examiner—Robert A. Hafer
Attorney, Agent, or Firm—Francis N. Carten

[57] ABSTRACT

A grommet clip, particularly useful for suspending air conditioning ducts, formed of a flat body having opposite portions snapped together along a fold line with means which penetrate a web on the duct and which define an eyelet to receive hangers for supporting the duct.

2 Claims, 6 Drawing Figures

GROMMET CLIP

BACKGROUND OF THE INVENTION

Flexible insulated ducts for air conditions systems have been suspended from overhead construction beams by circumferentially wrapped metal wire, metal strapping, fabric strips, rope or stapling wire. It has not been uncommon for suspension techniques of this type to result in ruptures of the outer wrapper or moisture barrier of the duct causing impairment of moisture resistance and at times even interfering with the capacity of the duct to carry air. An improvement over these earlier suspension means has been the use of metallic grommets crimped into a longitudinal seam of the outer wrapper or moisture barrier by hand or automatically by a crimping machine. There have been instances where the misplacing of such grommets have caused tears in the vapor barrier which worsen during the life of the system because of the weight of the duct. Also, some installations do not require grommets at all, or only along portions of the length of a given duct, and placing the grommets indiscriminately throughout the length of all ducts is unnecessary.

STATEMENT OF THE INVENTION

The present invention provides a grommet clip which comprises a body having first and second portions adapted to be brought together along a fold line in overlapping relation. First connecting means are provided on the first portion located remote from the fold line. Second connecting means on the second portion are similarly located remote from the fold line for interlocking with the first connecting means to hold the body portions in overlapped relation. First and second eyelet holes are formed in the respective first and second body portions which are aligned when the body portions are in interlocked overlapped relation. In its preferred form the grommet clip of the invention has a flat body and the respective connecting means are of male and female construction respectively, with the eyelet holes located in the body portions between the fold line and the respective connecting means.

Grommet clips of this form can be applied only where needed along a web of an insulated duct. Only normal finger pressure is required to squeeze their body portions together so that the connecting elements penetrate the web and snap together. No damage is done to the vapor barrier of the duct. The system is low in cost, easily installed without tools, and results in securely locked hanger means only at those selected locations where necessary.

DESCRIPTION OF PREFERRED EMBODIMENT

Figure 1:
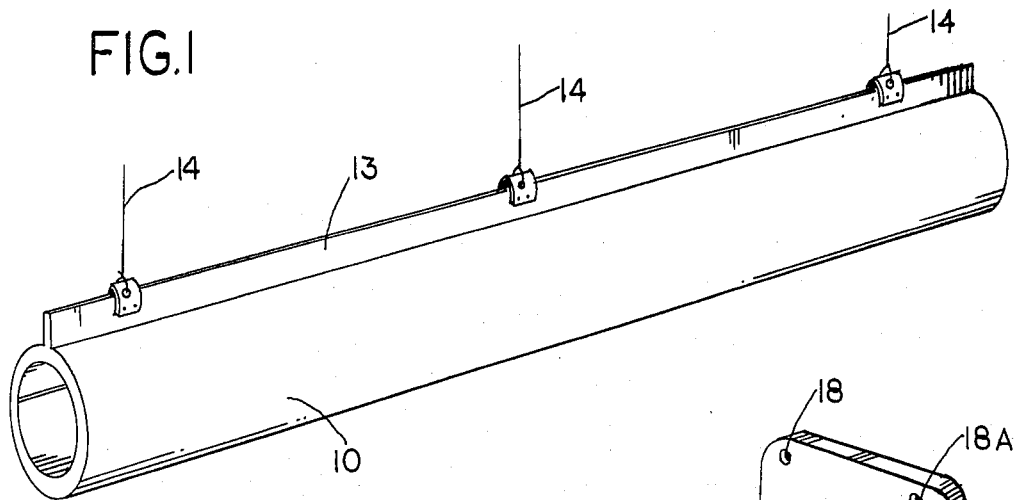
FIG. 1 is a pictorial view of a section of duct suspended by means of the grommet clips of the invention.
Figure 2:
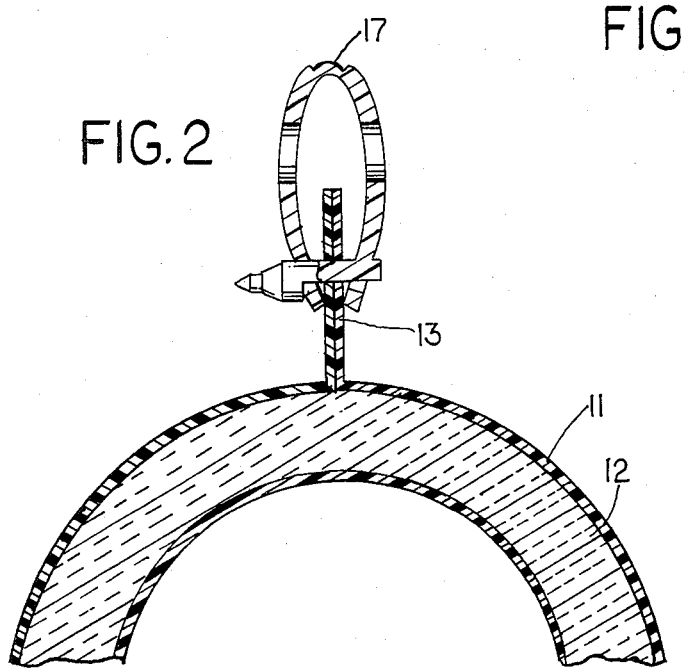
FIG. 2 is an enlarged fragmentary lateral section of the duct and one embodiment of the grommet clip of the invention.

Referring first to FIGS. 1 and 2, a section of a typical air conditioning duct 10 is illustrated having a composite wall with an outer vapor barrier 11 surrounding thermal insulation 12. Fabric reinforced plastic or other sheet material is typically employed for the vapor barrier 11. A longitudinal seam of the vapor barrier 11 is formed into a web 13 extending radially from the exterior of the duct throughout its length. When installed the flexible insulated duct 10 is suspended from overhead beams by hanger wires 14 but only at certain places throughout the length of the duct and with varying spacing between the hangers 14.

Figure 3:
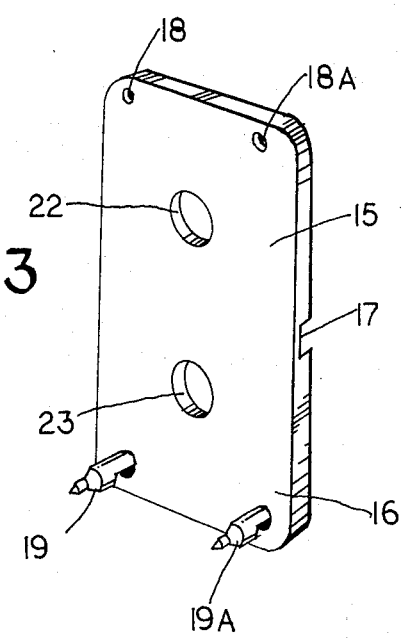
FIG. 3 is a perspective view of the grommet clip of FIG. 2 along in open position.

It is the principal purpose of the present invention to provide grommet clips for hand attachment in the field to the web 13 at those selected places where hanger wires 14 are necessary, thereby eliminating conventional metallic grommets crimped into the web at equal intervals throughout its length. Each such grommet clip includes a body having a first portion 15 and a second portion 16. The body is of plastic material selected for corrosion resistance and is of flat stock as shown particularly in FIG. 3. The first and second portions 15 and 16 of the body are separated by a linear section 17 indented into one surface of the body. This linear section 17 provides a fold line along which the body can be bent as shown in FIG. 2.

A pair of connecting holes 18 and 18A are formed at opposite corners of the first body portion 15 remote from the linear section 17. Extending from the surface of the body opposite that in which the linear section 17 is formed is a pair of snap-in pins 19 and 19A located at opposite corner areas of that second body portion.

Figure 4:
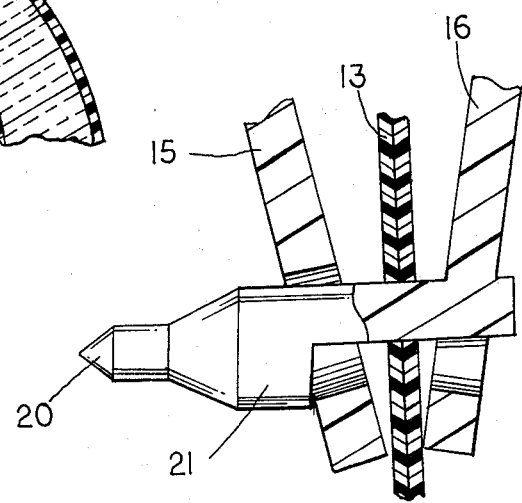
FIG. 4 is an enlarged fragmentary lateral section of the FIG. 2 grommet clip closed about the duct web.

As shown in FIG. 4 each of the pins 19 and 19A includes a pointed outer end portion 20 and an enlarged mid-section 21 which is slightly larger in diameter than the diameter of the corresponding hole 18. By this construction the body portion 15 may be folded over the body portion 16, bending along the linear section 17, so that the pins 19 and 19A are force-fitted through the holes 18 and 18A. The pointed portion 20 of each pin penetrates through the material of the web 13, aligns with the associated hole 18 and snap-locks in place as the enlarged mid-section 21 is forced through the hole 18. This attaches the grommet clip securely to the air conditioning duct by manual means with no tools required. The self-locking pins penetrate the web material without causing it damage and they are employed only at those portions of the duct where necessary.

A first eyelet hole 22 is located in the central area of the body portion 15 somewhat closer to the linear section 17 than to the outer end of the body porton 15. A second eyelet hole 23 is similarly located in a central area in the second body portion 16. When the body portions are brought together as shown in FIGS. 2 and 4 the eyelet holes 22 and 23 are aligned to form an opening through which the hanger wires 14 may be threaded.

Figure 5:
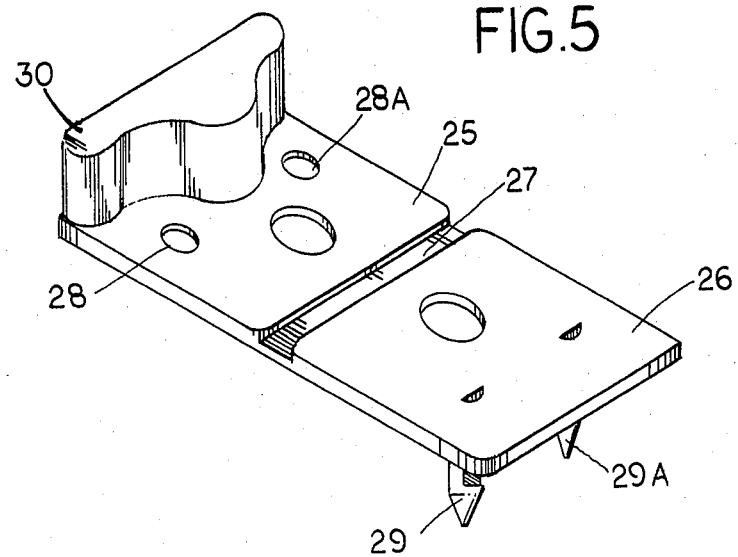
FIG. 5 is a perspective view of another form of the grommet clip of the invention.
Figure 6:
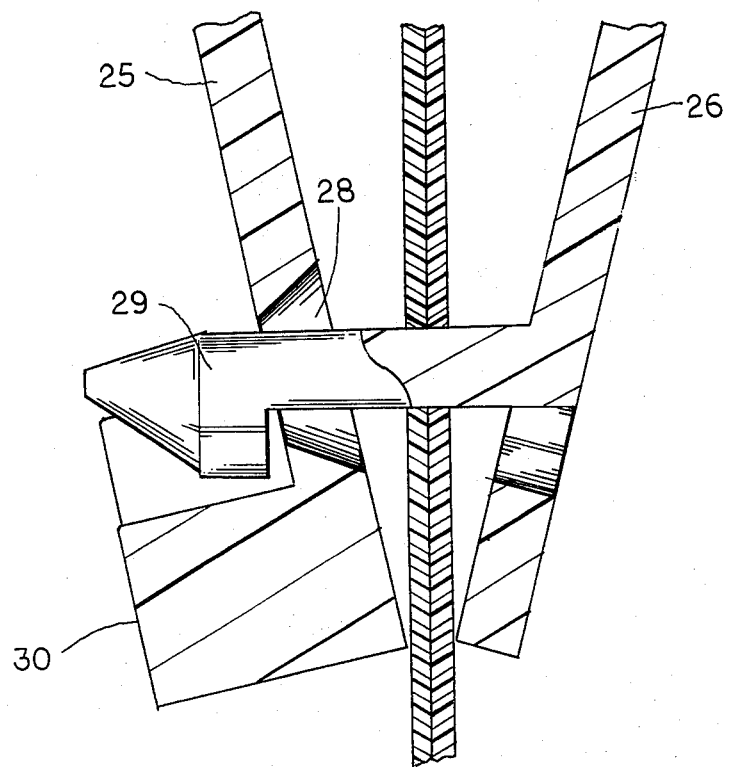
FIG. 6 is an enlarged fragmentary lateral section of the grommet clip of FIG. 5 closed about the duct web.

Referring now to the embodiment of FIGS. 5 and 6, the grommet clip includes first and second body portions 25 and 26 separated by a linear section 27 which serves as a fold line. Connecting holes 28 and 28A are located at the corner of the body portion 25, but in this embodiment they are chamfered as shown in FIG. 6 to allow easier interlocking action with snap-in pins 29 and 29A on the body portion 26.

The principal difference between this embodiment of FIGS. 5 and 6 and the prior embodiment is the provision on the body portion 25 of a finger guard 30 extending integrally from the side of the body portion 25 opposite the side into which the pins 29 and 29A enter the holes 28 and 28A. The guard 30 is located immediately adjacent the holes 28 and 28A and when the locking action is done manually the thumb or a finger of the operator rests on the guard 30 and is not contacted by the pins 28 and 28A as they snap into place with any degree of pressure which would be painful to the operator.

I claim:

1. In combination with a penetratable web, a grommet clip for penetrating said web and providing hanger means therefor comprising:
   (a) a flat body having first and second portions adapted to be brought together along a single fold line thinner than the remainder of the body in one predetermined overlapping position,
   (b) a connecting hole in the first body portion remote from the fold line,
   (c) a pointed snap-in pin projecting from the second body portion remote from the fold line for forcibly penetrating the web and the connecting hole when the body portions are in said overlapping positions to lock the body portions together about the penetrated web,
   (d) finger guard extension means integral with said first body portion and projecting outwardly from that side of the flat body opposite the projecting pin for preventing finger contact with the pointed pin as the body portions are locked together about the penetrated web, and
   (e) first and second eyelet holes located in the respective body portions which are aligned to receive suspension means when the body portions are in said interlocked overlapped position.

2. A grommet clip according to claim 1 wherein the body is of plastic and is rectangular, and wherein a pair of said connecting hole and projecting pin is provided, each pin having an enlarged midsection which fits forcibly within the associated connecting hole.

* * * * *